Patented Sept. 2, 1952

2,609,385

UNITED STATES PATENT OFFICE 2,609,385

3-METHYLENEGLUTARONITRILE

Ralph C. Schreyer, Wilmington, Del., assignor to E. I. du Pont de Nemours and Company, Wilmington, Del., a corporation of Delaware No Drawing. Application October 5, 1950, Serial No. 188,647

1 Claim. (Cl. 260—465.8)

This invention relates to a new composition of matter, 3-methyleneglutaronitrile, which is a polymerizable difunctional vinylic compound, and which is highly useful in the manufacture of various types of resinous products.

An object of this invention is to prepare a polymerizable vinylic compound having two functional groups symmetrically disposed with respect to a vinylic group. A further object of the invention is to prepare a polyamide intermediate having a vinylic substituent. A more specific object of the invention is to prepare 3-methyleneglutaronitrile. Other objects of the invention will appear hereinafter.

It has been discovered in accordance with this invention that the chlorination products of methallyl chloride, upon reaction with hydrogen cyanide in an aqueous, acidic medium yield 3-methyleneglutaronitrile.

The reaction of chlorine with methallyl chloride, either in the liquid phase or in the vapor phase, yields a dichloride mixture which evidently contains 1,3-dichloro-2-methylpropene, 1,3-dichloro-2-methylenepropane and 1,2-dichloro-2-methylpropane. There is no known method for separating these dichlorides from each other. They have very nearly the same boiling point and are quite similar in all of their other physical properties. Distillation of the methallyl chloride chlorination products therefore yields a dichloride cut which is a mixture of dichloro compounds, boiling at about the same temperature. In accordance with the present invention it is not necessary to separate 1,3-dichloro-2-methylenepropane from the said mixture in order to obtain the desired 3-methyleneglutaronitrile. When the entire mixture is treated with hydrogen cyanide in aqueous, acidic medium the only component which undergoes dicyanation is 1,3-dichloro-2-methylenepropane, and as a result the dinitrile obtained in this manner is 3-methyleneglutaronitrile.

The cyanation of the chlorinated methallyl chloride may be performed under the conditions disclosed for the cyanation of allylic-type chloride in the following patents: U. S. 2,477,617, U. S. 2,477,672, and U. S. 2,477,674. Preferably the reaction is carried out at a temperature within the range of 50° to 180° C., optimum results being achieved at about 60° to 100° C. The pressure may be atmospheric (in which event the HCN should be introduced portionwise or formed in situ by portionwise addition of an alkali metal cyanide into the aqueous, acidic reaction mixture) or superatmospheric (which is usually preferred when a continuous reactor is employed).

Any suitable aqueous, acidic medium may be employed. Dilute aqueous hydrochloric, sulfuric, phosphoric, oxalic, acetic, etc. acids are effective, as are also acidic buffered solutions including those containing sodium acetate-acetic acid and the like. If desired, any copper salt which is soluble in water may be employed as a catalyst, excellent results being obtained with catalytic quantities of cuprous chloride or other copper salts of inorganic or organic acids.

The invention is illustrated further by means of the following examples.

*Example 1.*—During a sixty-five minute period, 41 grams of chlorine and 105 grams of methallyl chloride were passed over 100 cc. of chipped quartz at a temperature of 150° to 180° C. The effluent product was passed through a condenser, and the condensate was distilled, yielding the following fractions:

(1) B. P. 65° to 133° C., 14 grams,
(2) B. P. 133° to 137° C., 28 grams, $n_D^{27}=1.4710$,
(3) B. P. 137° to 141° C., 32 grams, $n_D^{27}=1.4720$,
(4) B. P. 45° to 50° C. (3 mm.), 30 grams, chiefly trichloride;

Heel=20 grams.

The dichloride cuts 2 and 3 were combined (weight 60 grams) and admixed with 40 cc. water, 2 ml. concentrated aqueous hydrochloric acid, and 2 grams of $Cu_2Cl_2$. This mixture was heated with stirring at 95°, and an aqueous solution of 48 grams sodium cyanide in 200 cc. water was added dropwise at such a rate that the pH was maintained within the range of 1 to 6. The time required for the addition of the sodium cyanide solution was two hours. The excess hydrogen cyanide was boiled out of the resulting mixture, and the residue was cooled and extracted three times with chloroform. Distillation of the chloroform extract gave the following fractions:

(1) B. P. 40° to 45° C. (1.5-3 mm.), 13.5 grams, $n_D^{24}=1.4661$,
(2) B. P. 45° to 85° C. (1 mm.), 1.5 grams,
(3) B. P. 85° to 90° C. (1 mm.), 8 grams, solid-liquid mixture The solid portion of the highest boiling fraction was separated, washed with $CS_2$, and dried. It melted at 51° to 52° C. (per cent N, 25.6, 25.7; calculated for 3-methyleneglutaronitrile, per cent N, 26.4; 3-methyleneglutaronitrile structure confirmed by infrared analyses for terminal methylene group).

*Example 2.*—In a liquid phase process 142 grams of chlorine was added to 181 grams of methallyl chloride with stirring at a temperature of −60° to −20° C. over a one-hour period. The resulting product was warmed to room temperature and distilled under diminished pressure, yielding the following fractions:

(1) B. P. 32° to 36° C. (16–17 mm.), 115 grams, $n_D^{24}=1.4725$ (dichloride fraction),
(2) B. P. 37° to 40° C. (16–17 mm.), 37 grams, $n_D^{24}=1.4735$,
(3) B. P. 40° to 44° C. (16 mm.), 23 grams, $n_D^{24}=1.4742$,
Heel=70 grams.

Cuts 1 and 2 were combined and treated with hydrogen cyanide in the same manner as disclosed in Example 1. Distillation of the resulting material gave 27 grams of 3-methyleneglutaronitrile which boiled at a temperature of 95° to 100° C. and at a pressure of 1 mm. The melting point of this material after recrystallization from benzene was 50.3° C. (Calculated for $C_6H_6N_2$: C, 67.9; H, 5.67; N, 26.4. Found: C, 66.9, 67.0; H, 5.44, 5.43; N, 26.1, 26.0.)

It is to be understood, of course, that the above examples are illustrative only and that numerous methods for practicing the invention will occur to those who are skilled in the art. If desired, in the cyanation step, acceptors for hydrogen chloride may be present in the reaction mixture, especially when the hydrogen cyanide reactant is introduced as such into the acidic mixture. Suitable acceptors include the alkaline earth metal carbonates, oxides, hydroxides, etc. It is, however, essential that the reaction mixture remain acidic while the cyanation reaction is taking place.

The 3-methyleneglutaronitrile obtained in the practice of this invention is useful as an intermediate in the manufacture of polyamide resins. Moreover, it can be polymerized with free-radical producing catalysts and interpolymerized with ethylenic compounds such as ethylene, butadiene, etc., to form useful polymers. 3-methyleneglutaronitrile can be converted by hydrogenation to 3-methylpentamethylenediamine which is useful in the manufacture of 3-methylpentamethylenediamine adipamide, 3-methylpentamethylenediamine glutaramide, etc.

I claim:
3-methyleneglutaronitrile.

RALPH C. SCHREYER.

REFERENCES CITED

The following references are of record in the file of this patent:

UNITED STATES PATENTS

| Number | Name | Date |
|---|---|---|
| 2,232,785 | Howk | Feb. 25, 1941 |
| 2,477,617 | Johnson et al. | Aug. 2, 1949 |
| 2,477,672 | Webb et al. | Aug. 2, 1949 |
| 2,477,674 | Whitman | Aug. 2, 1949 |

OTHER REFERENCES

Coover et al.: Abst. of Ser. No. 59,762, Official Gazette, vol. 641, p. 320 (1950).